(12) United States Patent
Ernst et al.

(10) Patent No.: US 8,270,768 B2
(45) Date of Patent: Sep. 18, 2012

(54) DEPTH PERCEPTION

(75) Inventors: Fabian Edgar Ernst, Hoofddorp (NL);
Marc Joseph Rita Op De Beeck, Eindhoven (NL); Christiaan Varekamp, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 1055 days.

(21) Appl. No.: 11/813,110

(22) PCT Filed: Jan. 12, 2006

(86) PCT No.: PCT/IB2006/050114
§ 371 (c)(1),
(2), (4) Date: May 21, 2008

(87) PCT Pub. No.: WO2006/075304
PCT Pub. Date: Jul. 20, 2006

(65) Prior Publication Data
US 2009/0003728 A1    Jan. 1, 2009

(30) Foreign Application Priority Data

Jan. 12, 2005  (EP) .................................... 05100150

(51) Int. Cl.
*G06K 9/36* (2006.01)
(52) U.S. Cl. ........ 382/285; 382/154; 382/224; 382/264; 345/419
(58) Field of Classification Search .......... 345/419–427, 345/473–475, 646; 382/154, 224, 264, 285
See application file for complete search history.

(56) References Cited

U.S. PATENT DOCUMENTS

| 5,371,627 | A | | 12/1994 | Baccei et al. | |
|---|---|---|---|---|---|
| 5,526,446 | A | * | 6/1996 | Adelson et al. | 382/275 |
| 5,543,965 | A | | 8/1996 | Bielinski et al. | |
| 5,629,988 | A | * | 5/1997 | Burt et al. | 382/276 |
| 5,986,804 | A | | 11/1999 | Mashitani et al. | |
| 6,064,424 | A | | 5/2000 | Van Berkel et al. | |
| 6,295,070 | B1 | | 9/2001 | Wood | |
| 6,510,244 | B2 | | 1/2003 | Proesmans et al. | |
| 7,224,355 | B2 | * | 5/2007 | Auberger et al. | 345/419 |
| 2002/0167512 | A1 | * | 11/2002 | Lee et al. | 345/419 |
| 2003/0048237 | A1 | | 3/2003 | Sato et al. | |
| 2005/0129312 | A1 | * | 6/2005 | Ernst et al. | 382/173 |

(Continued)

FOREIGN PATENT DOCUMENTS
WO        WO9515063  A1    6/1995
(Continued)

OTHER PUBLICATIONS
Berretty et al: "High Quality Images From 2.5D Video" in Proceedings Eurographics, Granada, 2003, Short Note 124.

(Continued)

*Primary Examiner* — Jason M Repko
*Assistant Examiner* — David Perlman

(57) ABSTRACT

A method of rendering a multi-view image comprising a first output image and a second output image on basis of an input image (102) is disclosed. The method comprises: creating a modulation image (100) comprising irregular shaped objects (106-112); modulating pixel values of a portion of the input image (102) on basis of further pixel values of the modulation image (100), resulting into an intermediate image (104); and generating the multi-view image by means of warping the intermediate image on basis of the disparity data.

10 Claims, 5 Drawing Sheets

U.S. PATENT DOCUMENTS

Figure 1:
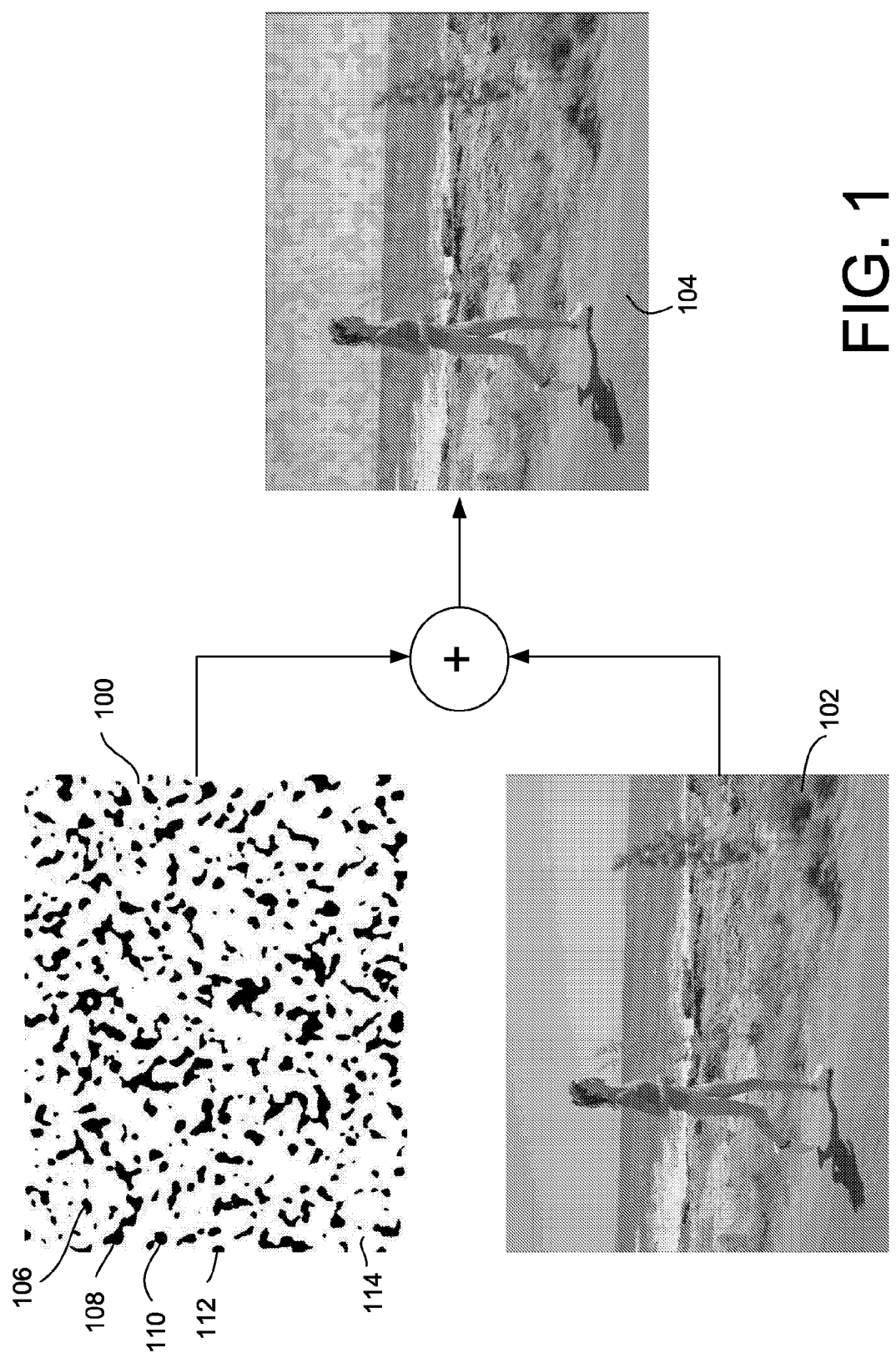

2006/0256853 A1* 11/2006 Schlockermann et al. .................. 375/240.03
2007/0036452 A1* 2/2007 Llach et al. .................. 382/254
2007/0070241 A1* 3/2007 Boyce et al. .................. 348/441

FOREIGN PATENT DOCUMENTS

WO    WO2004049255 A2    6/2004

OTHER PUBLICATIONS

Redert et al: "Synthesis of Multi Viewpoint Images at Non-Intermediate Positions"; Acoustics, Speech, and Signal Processing, 1997., 1997 IEEE International Conference in Munich, Germany, APRITL 21-24, Los Alamitos, CA, USA, IEEE Computer Society, US, vol. 4, Apr. 21, 1997, pp. 2749-2752, XP010225725.

De Haan et al: "True-Motion Estimation With 3-D Recursive Search Block Matching"; IEEE Transactions on Circuites and Systems for Video Technology, vol. 3, No. 5, pp. 368-379, Oct. 1993.

Sullivan, A.: "Solid-State Multi-Planar Volumetric Display"; Proceedings of SID '03, 1531-1533, 2003.

McAllister, D.F.: "Stereo Computer Graphics and Other True 3-D Technologies", Princeton University Press, 1993.

* cited by examiner

DEPTH PERCEPTION

The invention relates to a method of rendering a multi-view image on basis of an input image and disparity data.

The invention further relates to a rendering unit for rendering a multi-view image on basis of an input image and disparity data.

The invention further relates to an image processing apparatus comprising such a rendering unit.

The invention further relates to a computer program product to be loaded by a computer arrangement, comprising instructions to render a multi-view image on basis of an input image and disparity data, the computer arrangement comprising processing means and a memory.

Since the introduction of display devices, a realistic 3-D display device has been a dream for many. Many principles that should lead to such a display device have been investigated. Some principles try to create a realistic 3-D object in a certain volume. For instance, in the display device as disclosed in the article "Solid-state Multi-planar Volumetric Display", by A. Sullivan in proceedings of SID'03, 1531-1533, 2003, visual data is displaced at an array of planes by means of a fast projector. Each plane is a switchable diffuser. If the number of planes is sufficiently high the human brain integrates the picture and observes a realistic 3-D object. This principles allows a viewer to look around the object within some extent. In this display device all objects are (semi-)transparent.

Many others try to create a 3-D display device based on binocular disparity only. In these systems the left and right eye of the viewer perceives another image and consequently, the viewer perceives a 3-D image. An overview of these concepts can be found in the book "Stereo Computer Graphics and Other True 3-D Technologies", by D. F. McAllister (Ed.), Princeton University Press, 1993. A first principle uses shutter glasses in combination with for instance a CRT. If the odd frame is displayed, light is blocked for the left eye and if the even frame is displayed light is blocked for the right eye.

Display devices that show 3-D without the need for additional appliances are called auto-stereoscopic display devices.

A first glasses-free display device comprises a barrier to create cones of light aimed at the left and right eye of the viewer. The cones correspond for instance to the odd and even sub-pixel columns. By addressing these columns with the appropriate information, the viewer obtains different images in his left and right eye if he is positioned at the correct spot, and is able to perceive a 3-D picture.

A second glasses-free display device comprises an array of lenses to image the light of odd and even sub-pixel columns to the viewer's left and right eye.

The disadvantage of the above mentioned glasses-free display devices is that the viewer has to remain at a fixed position. To guide the viewer, indicators have been proposed to show the viewer that he is at the right position. See for instance U.S. Pat. No. 5,986,804 where a barrier plate is combined with a red and green led. In case the viewer is well positioned he sees a green light, and a red light otherwise.

To relieve the viewer of sitting at a fixed position, multi-view auto-stereoscopic display devices have been proposed. See for instance United States patents US60064424 and US20000912. In the display devices as disclosed in US60064424 and US20000912 a slanted lenticular is used, whereby the width of the lenticular is larger than two sub-pixels. In this way there are several images next to each other and the viewer has some freedom to move to the left and right.

In order to generate a 3-D impression on a multi-view display device, images from different virtual view points have to be rendered. This requires either multiple input views or some 3-D or depth information to be present. This depth information can be either recorded, generated from multiview camera systems or generated from conventional 2-D video material. For generating depth information from 2-D video several types of depth cues can be applied: such as structure from motion, focus information, geometric shapes and dynamic occlusion. The aim is to generate a dense depth map, i.e. per pixel a depth value. This depth map is subsequently used in rendering a multi-view image to give the viewer a depth impression. In the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997 a method of extracting depth information and of rendering a multi-view image on basis of the input image and the depth map are disclosed. The multi-view image is a set of images, to be displayed by a multi-view display device to create a 3-D impression. Typically, the images of the set are created on basis of an input image. Creating one of these images is done by shifting the pixels of the input image with respective amounts of shift. These amounts of shifts are called disparities. So, typically for each pixel there is a corresponding disparity value, together forming a disparity map. Disparity values and depth values are typically inversely related, i.e.:

$$S = \frac{C}{D} \tag{1}$$

with S being disparity, C a constant value and D being depth. Creating a depth map is considered to be equivalent with creating a disparity map.

For homogeneous regions in the 2-D input image, i.e. substantially texture less regions, it is hard or sometimes not possible to infer what the depth is from a multi-view display device. Usually, this will be perceived as the object corresponding to that homogeneous region as being at the screen level. In case there is a homogeneous background, e.g. a blue sky, the perceived depth of a multi-view display device is relatively small. In the case of a cloudless sky, the sky is perceived to be at the screen level, and hence for a correct depth impression it is not possible to put other objects behind the screen which reduces the depth impression considerably.

It is an object of the invention to provide a method of the kind described in the opening paragraph resulting into an increased depth impression.

This object of the invention is achieved in that the method comprises:
  creating a modulation image comprising irregular shaped objects;
  modulating pixel values of a portion of the input image on basis of further pixel values of the modulation image, resulting into an intermediate image; and
  generating the multi-view image by means of warping the intermediate image on basis of the disparity data.

Giving a viewer a 3-D impression on a multi-view display device relies on showing the first output image to the left and the second output image to the right eye. The differences between these output images are interpreted by the human brain as a 3-D image. The output images are constructed by shifting objects of the input image with respect to each other.

The amount of shift is determined by the depth of the objects. The brain recognizes the correspondence between the objects in different views, i.e. output images and infers the geometry from the differences. If an object is substantially texture less, such a correspondence is hard to make as there is no feature for the eyes "lock on" to. Imagine a homogeneous black surface. Shifting this to the left or the right doesn't change it. Hence it can not be inferred on the basis of parallax at which depth this surface resides.

By modulating pixel values of a portion of the input image on basis of further pixel values of the modulation image, features are introduced. These features corresponding to the irregular shaped objects are primarily visible in substantially homogeneous regions of the input image. Then, it is possible to render the first output image and the second output image which are visibly different in the regions corresponding to the portion of the input image which were substantially homogeneous before the modulation took place. Now it is possible for the user to make correspondence between the respective introduced irregular shaped objects in the first and second output image.

Preferably the size of the irregular shaped objects is related to the disparity data. For instance the average size of the irregular shaped objects has the same order of magnitude as the average value of the disparity data. Suppose that the disparity data comprises values in the range of 1-15 pixels then it is advantageous that the sizes, i.e. height and width of the irregular shaped objects, are substantially in the same range. Preferably, the average diameter of the irregular shaped objects is approximately 7-8 pixels for images of 1000*1000 pixels. With average diameter is meant the average distance between two edges.

The modulation of pixel values of the input image may cover the pixels spread over the input image. The modulation preferably covers the portion of the input image which corresponds to a substantially homogeneous region. Preferably the modulation is such that the luminance values of a first part of the pixels of the input image are increased while the luminance values of a second part of the luminance values of the pixels of the input image are decreased. For instance the first part of the pixels of the input image corresponds to the set of pixels of the modulation image representing the irregular shaped objects, while the second part of the pixels of the input image corresponds to another set of pixels of the modulation image representing the background. Preferably the average luminance value is not affected by the modulation, i.e. the average luminance value of the input image and the average luminance value of the intermediate image are substantially mutually equal.

In an embodiment of the method according to the invention, creating the modulation image comprises:
  creating a first image by generating noise;
  filtering the first image with a low-pass filter, resulting in a second image; and
  classifying the pixels of the second image by means of a threshold, resulting in the modulation image.

Generating noise is preferably performed by a random noise generator. The characteristics of the low-pass filter are preferably related to the disparity data in order to create irregular shaped objects with appropriate dimensions. Classifying is such that groups of connected pixels get labeled as belonging to respective irregular shaped objects, while further groups of connected pixels get labeled as background.

In an embodiment of the method according to the invention, modulating of pixel values is based on the disparity data. Preferably, the increase and decrease of luminance values depends on the local depth value and hence on the local disparity value for a pixel. The amount of increase and/or decrease is preferably higher for objects of the input image which are further away from the viewer.

In an embodiment of the method according to the invention, creating the modulation image is based on a motion vector which is computed on basis of a sequence of input images to which the input image belongs. Suppose that the method according to the invention is applied to a sequence of input images, e.g. a sequence of video images, which represent motion. For instance corresponding to a panning camera. If each of the input images of the sequence of input images is modulated by means of the same modulation image and displayed on a multi-view display device, the result could be as if the sequence of output images is watched through a dirty window. To prevent that, it is preferred that each of the input images is modulated by means of its own modulation image. A modulation image for modulating a particular input image may be based on a further modulation image being created for the previous input image, i.e. the image preceding the particular input image. Preferably the further modulation image is based on shifting the modulation image for modulating the particular input image in a direction and related to the motion in the scene. Preferably a motion vector being computed by analysis or modeling of the motion vector field corresponding to the particular input image is applied for shifting the modulation image for modulating the particular input image in order to achieve the further modulation image.

It is a further object of the invention to provide a rendering unit of the kind described in the opening paragraph, resulting into an increased depth impression.

This object of the invention is achieved in that the rendering unit comprises:
  creating means for creating a modulation image comprising irregular shaped objects;
  modulating means for modulating pixel values of a portion of the input image on basis of further pixel values of the modulation image, resulting into an intermediate image; and
  generating the multi-view image by means of warping the intermediate image on basis of the disparity data.

It is a further object of the invention to provide an image processing apparatus comprising a rendering unit of the kind described in the opening paragraph, resulting into an increased depth impression.

This object of the invention is achieved in that the rendering unit comprises:
  creating means for creating a modulation image comprising irregular shaped objects;
  modulating means for modulating pixel values of a portion of the input image on basis of further pixel values of the modulation image, resulting into an intermediate image; and
  generating the multi-view image by means of warping the intermediate image on basis of the disparity data.

It is a further object of the invention to provide a computer program product of the kind described in the opening paragraph, resulting into an increased depth impression.

This object of the invention is achieved in that the computer program product, after being loaded, provides said processing means with the capability to carry out:
  creating a modulation image comprising irregular shaped objects;
  modulating pixel values of a portion of the input image on basis of further pixel values of the modulation image, resulting into an intermediate image; and
  generating the multi-view image by means of warping the intermediate image on basis of the disparity data.

Modifications of the rendering unit and variations thereof may correspond to modifications and variations thereof of the image processing apparatus, the method and the computer program product, being described.

Figure 2:
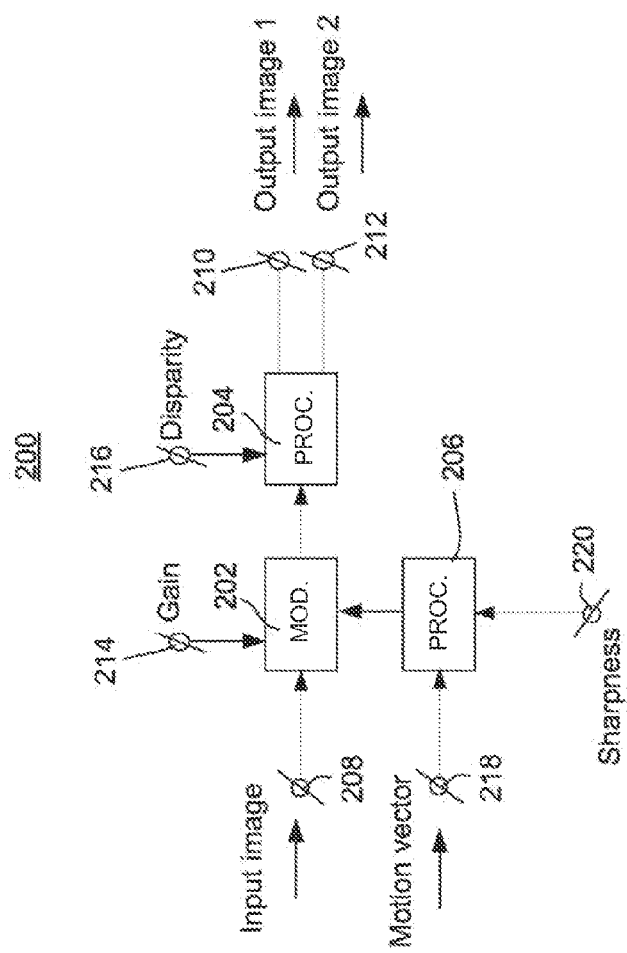
Figure 3:
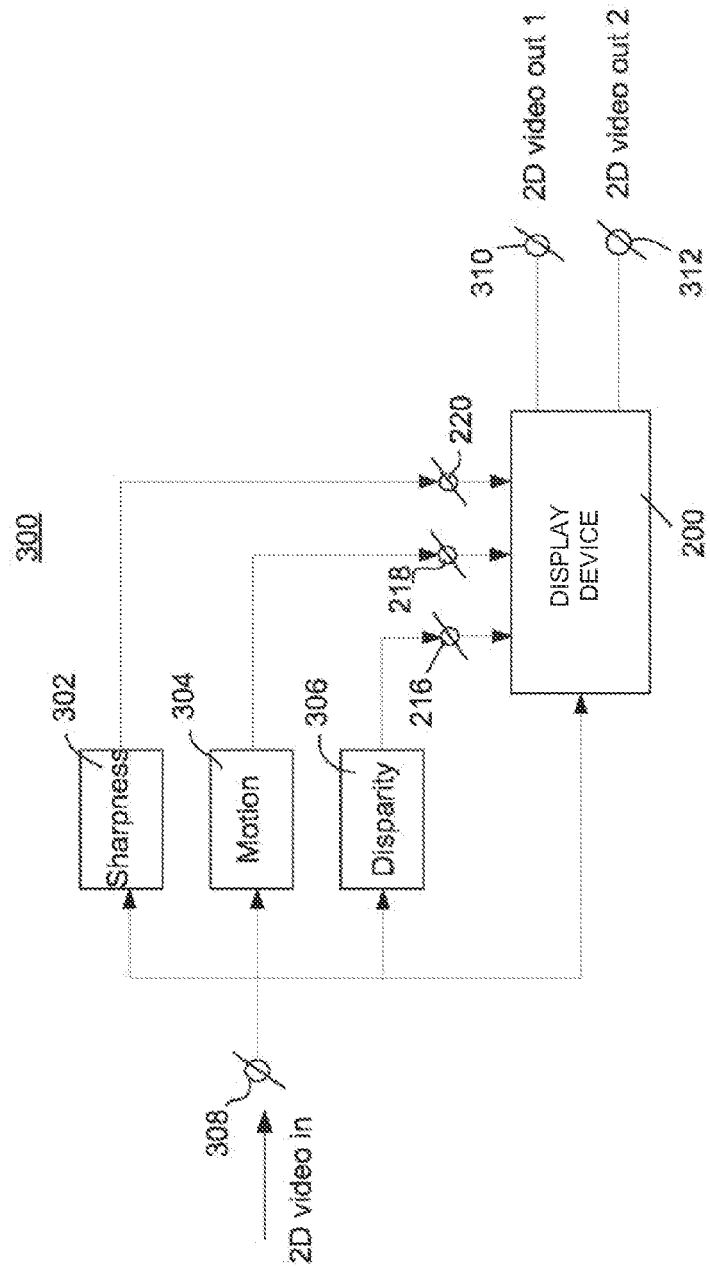
Figure 4:
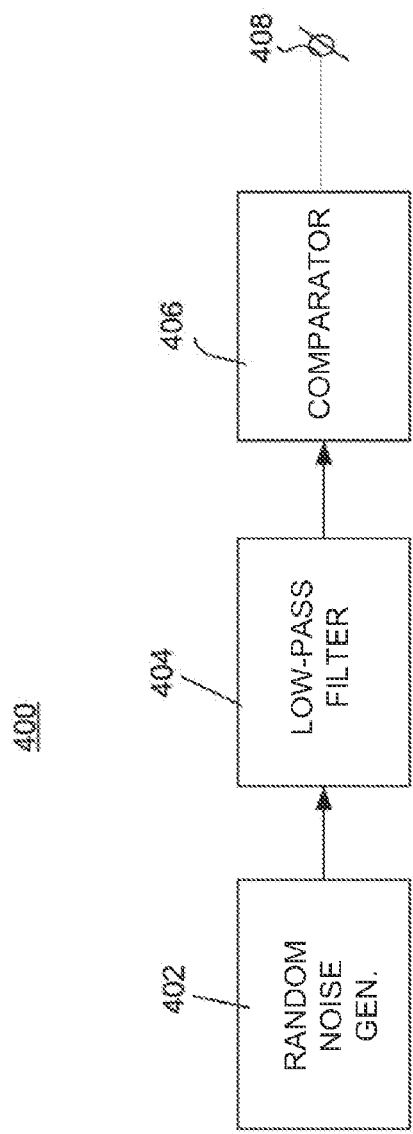
Figure 5:
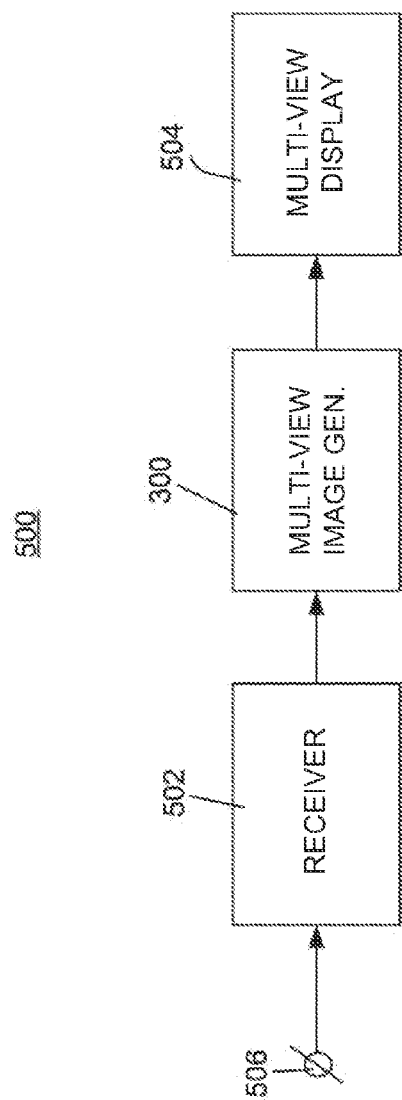

These and other aspects of the rendering unit, of the image processing apparatus, of the method and of the computer program product, according to the invention will become apparent from and will be elucidated with respect to the implementations and embodiments described hereinafter and with reference to the accompanying drawings, wherein:

FIG. 1 shows a modulation image, an input image and an intermediate image according to the invention;

FIG. 2 schematically shows an embodiment of the rendering unit according to the invention;

FIG. 3 schematically shows a multi-view image generation unit comprising an embodiment of the rendering unit according to the invention;

FIG. 4 schematically shows an embodiment of a modulation image creating device; and FIG. 5 schematically shows an embodiment of the image processing apparatus according to the invention.

Same reference numerals are used to denote similar parts throughout the Figures.

FIG. 1 shows a modulation image 100, an input image 102 and an intermediate image 104 according to the invention. The input image 102 is an image from a video sequence. The modulation image 100 has the same dimensions as the input image 102, i.e. comprises the same number of pixels. Then, modulation of the input image 102 by the modulation image 100 is straightforward. For each of the pixels of the input image 102 there is a corresponding pixel in the modulation image 100 which is directly related to the amount of the increase or decrease of the respective luminance value. Alternatively, the modulation image 100 and the input image 102 have mutually different dimensions. Then, modulation of the input image 102 may be either performed by applying the modulation image 100 several times or by applying only a portion of the modulation image 100. Alternatively, the modulation is only performed to a portion of pixels of the input image.

Preferably, the modulation image 100 comprises a first group of connected pixels 114 which together form the background and further comprises a second group of pixels which form foreground objects 106-112. These foreground objects are irregular shaped objects. These irregular shaped objects 106-112 look like stains. Preferably, there is no correlation between the shape of these irregular shaped objects 106-112 and the shape of objects in the input image 102.

The average size of these irregular shaped objects 106-112 is related to the amount of disparity and hence depth. It should be noted that the different irregular shaped objects 106-112 may have mutually different dimensions. Also the amount of disparity for the different pixels of the input image 102 and hence for the intermediate image 104 typically shows a deviation. However the average size of the disparity and the average size of the irregular shaped objects 106-112 preferably have the same order of magnitude.

FIG. 1 shows an intermediate image 104 according to the invention. The irregular shaped objects 106-112 are clearly visible. It should be noted that the shown intermediate image 104 is just an example to illustrate the effect of an exaggerated modulation. Preferably, the irregular shaped objects are less noticeable. That means that they should not be so prominent. Typically, the range and number of distinct luminance values in the modulation image 100 is relatively small compared with the number of luminance values in the input image 102. Suppose that the range of luminance values of the input image 102 comprises 256 different values. Then, typically the range of luminance values of the modulation image 100 comprises the values [−2,2]. For instance the luminance values of the first group of pixels, i.e. the background 114, are all equal to −2 or −1, while the luminance values of the second group of pixels, i.e. the irregular shaped objects 106-112 are all equal to +2 or +1.

FIG. 2 schematically shows an embodiment of the rendering unit 200 according to the invention. The rendering unit 200 is arranged to render a multi-view image comprising a first output image and a second output image on basis of an input image 102. The input image 102 is provided at the image input connector 208. The first output image and the second output image are provided by the rendering unit 200 at its image output connectors 210 and 212. The rendering unit 200 comprises:

a modulation image creating device 206 for creating a modulation image 100 comprising irregular shaped objects 106-112;

a modulating device 202 for modulating pixel values of a portion of the input image 102 on basis of further pixel values of the modulation image 100, resulting into an intermediate image 104; and a generating device 204 for generating the first output image by means of warping the intermediate image on basis of a first transformation which is based on disparity data and generating the second output image by means of warping the intermediate image on basis of a second transformation which is based on the disparity data.

The modulation image creating device 206, the modulating device 202 and the generating device 204 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

In connection with FIG. 4 an embodiment of a modulation image creating device 206 is described.

Preferably, modulating device 202 is arranged to perform the function as specified in Equation 2.

$$L_{out}(x,y)=L_{in}(x,y)+g(x,y)*L_{mod}(x,y), \quad (2)$$

wherein:

$L_{in}(x,y)$ is the luminance value of a pixel of the input image 102 with coordinates (x,y);

$L_{out}(x,y)$ is the luminance value of a pixel of the intermediate image 104, i.e. the output of the modulating device, with coordinates (x,y);

$L_{mod}(x,y)$ is the luminance value of a pixel of the modulation image 100, with coordinates (x,y); and $g(x,y)$ is a gain factor which is preferably adjustable by the user. The gain $g(x,y)$ may be equal for all pixels, but preferably each of the pixels has its own gain factor. The actual value of the gain $g(x,y)$ can be provided by means of the gain input connector 214.

The generating device 204 is arranged to render the first output image and the second output image. The rendering is e.g. as described in the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997. Alternatively, the rendering is as described in "High-quality images from 2.5D video", by R. P. Berretty and F. E. Ernst, in Proceedings Eurographics, Granada, 2003, Short Note 124. For the rendering the generating device 204 requires disparity or depth information which is provided by means of the disparity input connector 216.

The modulation image creating device 206 may comprise the following two optional input connectors: sharpness input connector 220 and a motion vector input connector 218.

Preferably, the introduction of irregular shaped objects in the input image is limited to only that portion of the input image which is substantially homogeneous. This may be achieved by only locally, i.e. in the substantially homogeneous regions, modulating the input image. Alternatively, information about the image content of the input image, in particular the presence and location of homogeneous regions is taken into account by the modulation image creating device 206. That information may be provided by an external sharpness computation device 302, or may be computed by the rendering unit 200 itself. In both cases the sharpness information is determined on basis of computing sharpness values for pixels of an image. Preferably that is the particular input image to which the modulation image will be added or with which the modulation image will be combined. Alternatively, the sharpness information is determined on basis of computing sharpness values for pixels of an other image from a sequence of images to which the particular input image belongs.

Preferably, the sharpness value of a particular pixel is determined by computing a difference of the luminance and/or color value of the particular pixel and the luminance and/or color value of a neighboring pixel of the particular pixel. By computing the sharpness values of the respective pixels of an image a sharpness map is formed. A relatively high difference between luminance and/or color values means a relatively high sharpness value. Subsequently, the sharpness map is analyzed and optionally adapted. That means that a first region with relatively many pixels with relatively low sharpness values is determined and that a second region with relatively many pixels with relatively high sharpness values is determined. The first region is assumed to be a homogeneous region and the second region is assumed to be a textured or detailed region. On basis of that classification the values of the gain factor g(x,y) are determined and the modulation image 100 is created. Typically this means that the luminance values $L_{mod}(x,y)$ of the modulation image 100 corresponding to the first region are such that they have no or no substantial effect on the input image 100 during modulation, e.g. $L_{mod}(x,y)=0$, while the luminance values $L_{mod}(x,y)$ of the modulation image 100 corresponding to the second region are such that they do have effect on the input image 100 during modulation, e.g. $L_{mod}(x,y)=-2, -1, 1$ or $2$.

The sharpness map comprising the classification information is provided to the rendering unit 200 by means of the sharpness input connector 220.

The creation of subsequent modulation images, corresponding to subsequent input images, may be performed completely independent of each other. Alternatively there is a relation between the creation of a particular modulation image and a subsequent modulation image. It is advantageous to take into account the motion between subsequent input images by the creation of subsequent modulation images. But analyzing the motion between a particular input image and its successor it is possible to determine a shift. This shift is preferably applied to shift the particular modulation image in order to achieve the next modulation image. The motion between subsequent input images is preferably based on making a motion model on basis of a motion vector field. Such a motion vector field is determined by means of a motion estimator. The motion estimator is e.g. as specified in the article "True-Motion Estimation with 3-D Recursive Search Block Matching" by G. de Haan et al. in IEEE Transactions on circuits and systems for video technology, vol. 3, no. 5, October 1993, pages 368-379.

The motion information is provided to the rendering unit 200 by means of the motion vector input connector 218.

FIG. 3 schematically shows a multi-view image generation unit 300 comprising an embodiment of the rendering unit 200 according to the invention. The multi-view image generation unit 300 is arranged to generate a sequence of multi-view images on basis of a sequence of video images. The multi-view image generation unit 300 is provided with a stream of video images at the input connector 308 and provides two correlated streams of video images at the output connectors 310 and 312, respectively. These two correlated streams of video images are to be provided to a multi-view display device which is arranged to visualize a first series of views on basis of the first one of the correlated streams of video images and to visualize a second series of views on basis of the second one of the correlated streams of video images. If a user, i.e. viewer, observes the first series of views by his left eye and the second series of views by his right eye he notices a 3-D impression. It might be that the first one of the correlated streams of video images corresponds to the sequence of video images as received and that the second one of the correlated streams of video images is rendered according to the method of the invention on basis of the sequence of video images as received. Preferably, both streams of video images are rendered according to the method of the invention on basis of the sequence of video images image as received.

The multi-view image generation unit 300 further comprises:
  a sharpness computation device 302 for determining which regions of the input image are homogeneous. The output of the sharpness computation device 302 is provided to the rendering unit 200 by means of the sharpness input connector 220;
  a motion estimator 304 for estimating motion between subsequent input images. The output of the motion estimator 304 is provided to the rendering unit 200 by means of the motion vector input connector 218; and
  a depth creation unit 306 for determining depth information of the various objects in the input images. On basis of the depth information disparity maps are determined which are provided to the rendering unit 300 by means of the disparity input connector 216.

It should be noted that, although the multi-view image generation unit 300 is designed to deal with video images, alternative embodiments of multi-view image generation unit 300 are arranged to generate a multi-view image on basis of individual images, i.e. still pictures.

It should be noted that, although the depicted multiview image generation unit 300 has two output connectors 310 and 312, alternative ways of outputting are possible. Besides that, the number of output images forming one multiview image is certainly not limited to the number of two.

FIG. 4 schematically shows an embodiment of a modulation image creating device 206 according to the invention. The modulation image creating device comprises:
  a random noise generator 402 for creating a first image;
  a low-pass filter 404 for filtering the first image, resulting into a second image. The characteristics of the low-pass filter are related to the disparity data in order to create irregular shaped objects with appropriate dimensions; and a comparing device 406 for comparing the pixel values of the second image with a predetermined threshold in order to classify the pixels of the second image, resulting into the modulation image. Classifying is such that groups of connected pixels get labeled as belonging to respective irregular shaped objects, while further groups of connected pixels get labeled as background.

FIG. 5 schematically shows an embodiment of the image processing apparatus 500 according to the invention, comprising:

a receiving unit 502 for receiving a video signal representing input images;

a multi-view image generation unit 300 for generating multi-view images on basis of the received input images, as described in connection with FIG. 3; and a multi-view display device 504 for displaying the multi-view images as provided by the multi-view image generation unit 300.

The video signal may be a broadcast signal received via an antenna or cable but may also be a signal from a storage device like a VCR (Video Cassette Recorder) or Digital Versatile Disk (DVD). The signal is provided at the input connector 506. The image processing apparatus 500 might e.g. be a TV. Alternatively the image processing apparatus 500 does not comprise the optional display device but provides the output images to an apparatus that does comprise a display device 504. Then the image processing apparatus 500 might be e.g. a set top box, a satellite-tuner, a VCR player, a DVD player or recorder. Optionally the image processing apparatus 500 comprises storage means, like a hard-disk or means for storage on removable media, e.g. optical disks. The image processing apparatus 500 might also be a system being applied by a film-studio or broadcaster.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, etcetera do not indicate any ordering. These words are to be interpreted as names.

The invention claimed is:

1. A method of rendering a multi-view image based on an input image and disparity data, the method comprising acts of:
   generating noise to form a first image;
   filtering the first image with a low-pass filter to form a second image;
   classifying the pixels of the second image as belonging to one or more of a plurality of irregular shaped objects by means of a threshold to form a modulation image comprising the irregular shaped objects;
   modulating pixel values of a portion of the input image based on further pixel values of the modulation image, resulting in an intermediate image; and
   generating the multi-view image by warping the intermediate image based on the disparity data.

2. The method as claimed in claim 1, wherein a size of the irregular shaped objects is related to the disparity data.

3. The method as claimed in claim 2, wherein an average size of the irregular shaped objects is the same order of magnitude as an average value of the disparity data.

4. The method as claimed in claim 1, wherein a portion of the input image is a substantially homogeneous region.

5. The method as claimed in claim 1, wherein generating noise is performed by a random noise generator.

6. A method of rendering a multi-view image based on an input image and disparity data, the method comprising acts of:
   generating noise to form a first image;
   filtering the first image with a low-pass filter to form a second image;
   classifying the pixels of the second image by means of a threshold to form a modulation image comprising irregular shaped objects;
   modulating pixel values of a portion of the input image based on the disparity data, resulting in an intermediate image; and
   generating the multi-view image by warping the intermediate image based on the disparity data.

7. The method as claimed in claim 1, wherein the input image is one of a sequence of input images and the created modulation image is based on a motion vector computed based on the sequence of input images to which the input image belongs.

8. A rendering unit for rendering a multi-view image based on an input image and disparity data, the rendering unit comprising:
   a processor for
      generating noise to form a first image,
      filtering the first image with a low-pass filter to form a second image, and
      classifying the pixels of the second image as belonging to one or more of a plurality of irregular shaped objects by means of a threshold to form a modulation image comprising the irregular shaped objects; and
   a modulator for modulating pixel values of a portion of the input image on basis of further pixel values of the modulation image, resulting into an intermediate image,
   wherein the processor generates the multi-view image by warping the intermediate image on basis of the disparity data.

9. An image processing apparatus comprising:
   a receiver for receiving a signal corresponding to an input image;
   a display device for rendering a multi-view image based on the input image and disparity data, the rendering unit comprising:
   a processor for
      generating noise to form a first image,
      filtering the first image with a low-pass filter to form a second image, and
      classifying the pixels of the second image as belonging to one or more of a plurality of irregular shaped objects by means of a threshold to form a modulation image comprising the irregular shaped objects; and
   a modulator for modulating pixel values of a portion of the input image on basis of further pixel values of the modulation image, resulting into an intermediate image, wherein the processor generates the multi-view image by warping the intermediate image on basis of the disparity data, and displays the multi-view image on the display device.

10. A computer program product embodying non-transitory computer instructions readable by a computer arrangement, the instructions comprising a method to render a multi-view image based on an input image and disparity data, the method comprising acts of:

generating noise to form a first image;

filtering the first image with a low-pass filter to form a second image;

classifying the pixels of the second image as belonging to one or more of a plurality of irregular shaped obiects by means of a threshold to form a modulation image comprising the irregular shaped objects;

modulating pixel values of a portion of the input image based on further pixel values of the modulation image, resulting in an intermediate image; and generating the multi-view image by warping the intermediate image based on the disparity data.

* * * * *